H. L. GOTTSCHALK.
ARTIFICIAL FISH BAIT.
APPLICATION FILED APR. 26, 1919.

1,318,073.

Patented Oct. 7, 1919.

Inventor
Henry L. Gottschalk

Attorneys

UNITED STATES PATENT OFFICE.

HENRY L. GOTTSCHALK, OF CHICAGO, ILLINOIS.

ARTIFICIAL FISH-BAIT.

1,318,073.     Specification of Letters Patent.     Patented Oct. 7, 1919.

Application filed April 26, 1919. Serial No. 292,828.

*To all whom it may concern:*

Be it known that I, HENRY L. GOTTSCHALK, a citizen of the United States, residing at Chicago, in the county of Cook and State of Illinois, have invented new and useful Improvements in Artificial Fish-Bait, of which the following is a specification.

This invention relates to artificial fish bait consisting of a buoyant body carrying hooks which normally lie close to the body and which are projected into the mouth of the fish when the latter seizes the bait, whereby the hooks positively take hold and the fish is effectually prevented from getting clear of the hook and escaping.

The invention has for its object to provide a simple and efficient bait device of the kind stated, and to this end it consists in a novel combination and arrangement of parts to be hereinafter described and claimed.

In order that the invention may be better understood, reference is had to the accompanying drawing, forming a part of this specification, and in said drawing, Figure 1 is an elevation of the device;

Figure 1:
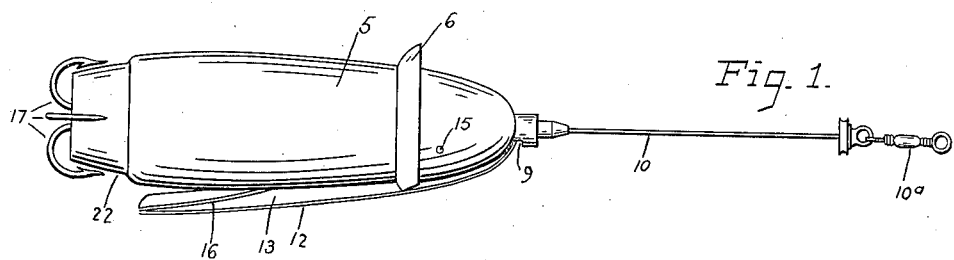
Figure 2:
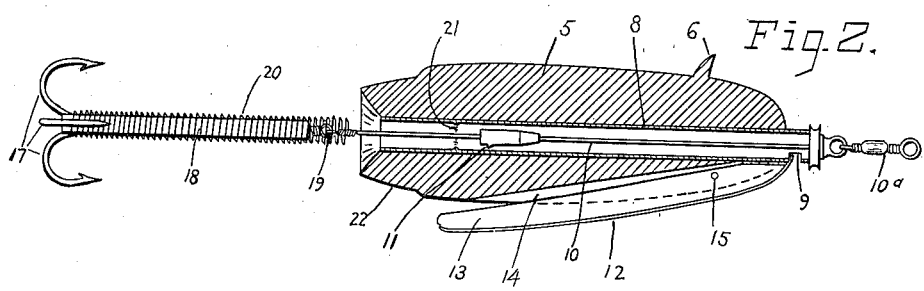
Fig. 2 is a longitudinal section of the device with the hooks projected.
Figure 3:
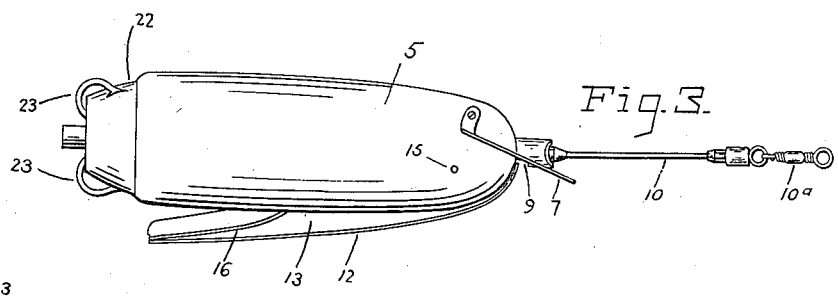
Figs. 3 and 4 are views similar to Figs. 1 and 2, showing a modification.
Figure 4:
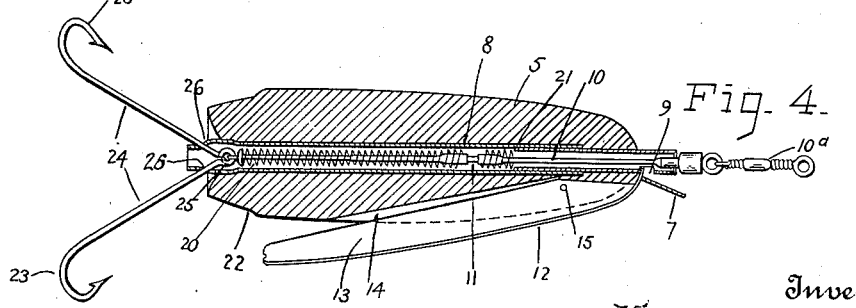

Referring specifically to the drawing the reference numeral 5 denotes a bait body, the same being made of wood or other buoyant material. In Figs. 1 and 2 the forward end of the body is shown with an outstanding flange 6 extending around the sides and over the top thereof, and serving to give the body, when drawn through the water, a movement simulating that of a fish in motion. In Figs. 3 and 4 the same effect is obtained by a downwardly and forwardly inclined plate 7 secured to the body.

The bait body 5 shown in Figs. 1 and 2 is provided with a central longitudinal opening, from one end to the other, in which seats a sleeve 8 which projects a short distance from the front end of the body and here has a bottom aperture 9. A similar opening and sleeve are provided for the bait body shown in Figs. 3 and 4.

In both embodiments of the invention a rod 10 extends loosely through the sleeve 8, and this rod has an enlarged portion provided with a keeper notch 11 for a latch. This latch is a thin flat plate or leaf 12 positioned beneath the bottom of the bait body and having an outstanding flange 13 on the side facing the latter, said flange seating slidably in a slot 14 in the bait body. At the forward end of the bait body, a cross pin 15 passes through the same and through the flange 13, whereby the plate 12 is pivotally connected to the bait body. The forward end of the plate 12 is turned up to enter the opening 9 and engage the notch 11. The latch plate is held normally spaced from the bait body by a light spring 16 carried by the latter and bearing on the rear end of the plate.

To the forward end of the rod 9 is connected the usual swivel 10ª for attachment of the line.

In Figs. 1 and 2, the bait body 5 is provided with a plurality of hooks 17 extending from the rear end of a single straight shank 18 which is loosely connected at its forward end, as shown at 19, to the rear end of the rod 10.

Around the shank 18 is coiled a spring 20 having one end made fast to the rear end of the shank 18, and in the sleeve 8 is a shoulder or abutment 21 against which the other end of the spring bears when the rod 10 is drawn forward.

In use, the rod 10 is drawn forward in the sleeve 8 until the latch device 12 snaps behind the keeper 11, which holds the rod advanced. Upon drawing the rod forwardly, the shank 18 enters the sleeve 8 and the spring 20 is placed under tension upon coming in contact at its forward end with the shoulder 21. The shank 18 is now housed in the sleeve 8 and the hooks 17 extend around the rear end of the bait body and lie closely thereagainst, as shown in Fig. 1. The rear end of the bait body is reduced in diameter, as shown at 22, which produces a recess in which the hooks are housed sufficiently to prevent the same from gathering weeds.

When the fish seizes the bait and closes with the mouth down thereon, and on the latch plate or leaf 12, the latter is swung to release the rod 10, whereupon the latter is freed, and the spring 20, upon expanding, shoots the shank 18 rearwardly to project the hooks 17 into the mouth of the fish. As the shank 18 is loosely connected to the rod 10 it will throw the hooks against the wall or bottom of the mouth of the fish, assuring a grip on the same.

In Figs. 3 and 4, the bait is provided with two hooks 23 having their shanks 24 separately and loosely connected, as shown at 25, to the rear end of the rod 10. The sleeve 8 projects a short distance from the rear end of the bait body 5, and here has two diametrically opposite apertures 26 through which the hook shanks 24 slidably pass. When the rod 10 is drawn forwardly, the shanks slide through the apertures 26 and are drawn together to seat the hooks 23 against the rear end of the bait body as shown in Fig. 3. Upon release of the rod 10, the latter shoots rearwardly and slides the hook shanks in the same direction through the apertures 26, and the latter cause the hooks to spread as shown in Fig. 4, and as this occurs in the mouth of the fish, a catch is assured.

I claim:

An artificial fish bait comprising a body, a rod extending lengthwise through the body and slidable therein, a spring for forcing the rod rearwardly, a latch device for holding the rod retracted, said device having an actuating part consisting of a plate located outside the body and having an outstanding flange on the side which faces the body, said body having a slot in which the flange seats and is pivoted, and hooks loosely connected to the rear end of the rod and seating against the rear end of the body when the rod is retracted.

In testimony whereof I affix my signature.

HENRY L. GOTTSCHALK.